Dec. 30, 1930.   F. L. PURDY   1,787,167
CONNECTING MEANS FOR RAFTERS
Original Filed Dec. 7, 1927
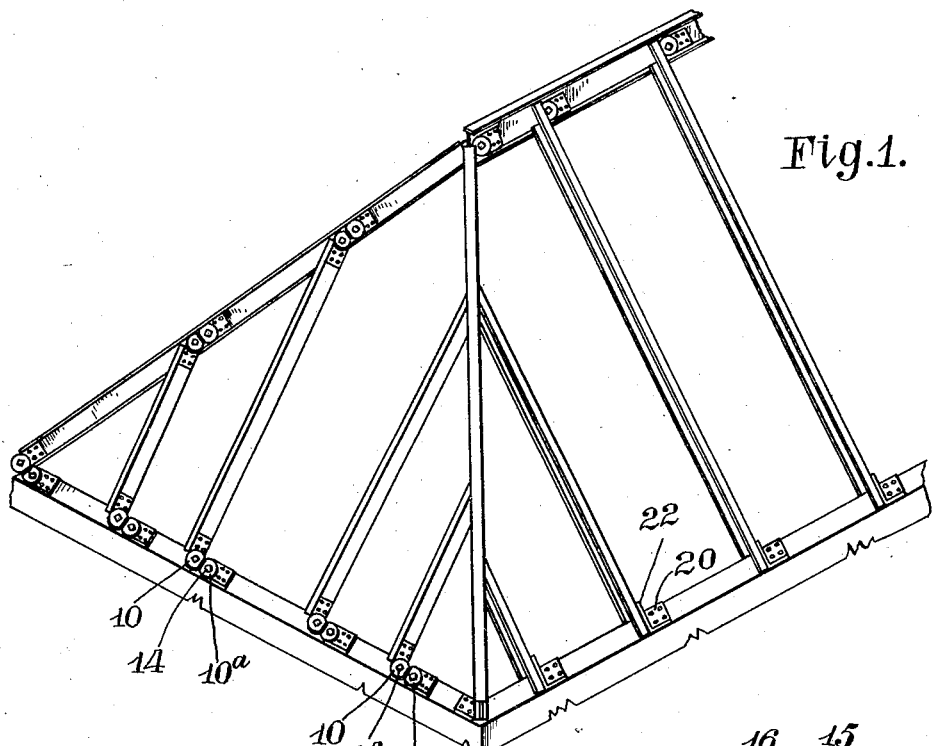
Fig.1.
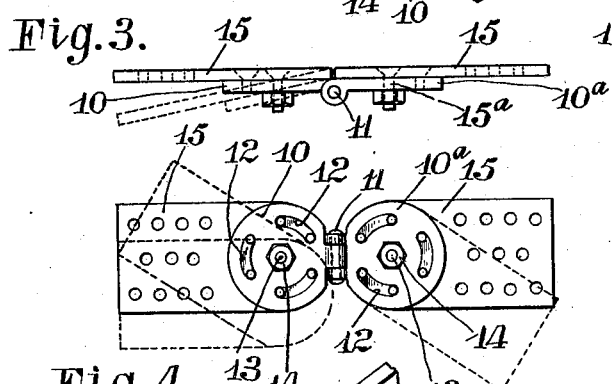
Fig.3.
Fig.4.
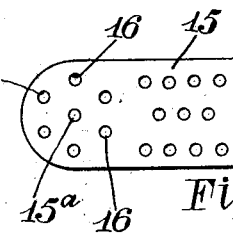
Fig.5.
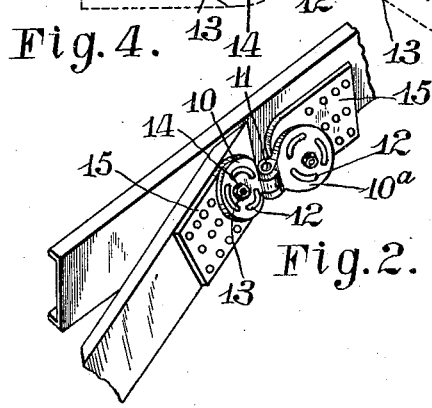
Fig.2.
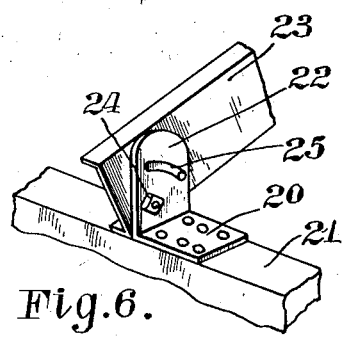
Fig.6.
Inventor
FREDERICK L. PURDY
By
his Attorneys Patented Dec. 30, 1930

1,787,167

UNITED STATES PATENT OFFICE

FREDERICK L. PURDY, OF COLUMBUS, OHIO

CONNECTING MEANS FOR RAFTERS

Application filed December 7, 1927, Serial No. 238,366. Renewed June 19, 1928.

This invention relates to rafters, its principal object being to avoid special bent connection where they are to be joined to the plate and the ridge of hip and where two or more members meet in different planes. The invention is more particularly useful in framing the roofs of steel framed dwellings where the material is light and practically all of standard frame units except in roofs where hips and valleys occur. Other objects and advantages of the invention will appear from the disclosure herein.

The invention is embodied in the example herein shown and described, the features of novelty being finally claimed.

In the accompanying drawing—

Figure 1 is a perspective view of a portion of roof frame showing the invention applied therein.

Fig. 2 is a detail in perspective on a larger scale showing a jack rafter connected to a hip with the joint connecting means of my invention, one of the leaf parts being laterally shifted.

Fig. 3 is an edge view of the joint or connecting means.

Fig. 4 is a face view of the same.

Fig. 5 is a face view of one of the leaf members of the joint.

Fig. 6 is a modification showing a thrust member for connecting a rafter with the plate.

In the views, and referring first to Figs. 1 and 5 inclusive, the connecting member or joint includes two nearly circular leaf parts 10 and 10ª provided with interengaged hinge eyes connected by a pintle 11. The parts 10 and 10ª are each cut with equally spaced arcuate slots 12 of somewhat more than 60 degrees length concentric with the center of the part. The parts 10 and 10ª are each also drilled or punched with a bolt hole at its center, and to each of said parts 10 and 10ª is secured by means of a threaded bolt 13 and nut 14 a second and elongated leaf part 15, said bolt being passed through a hole 15ª in a part 15 and the center hole of the circular part. When the nut 14 is loosened the part 15 can be swung in a plane at right angles to the direction of movement of the circular parts of the hinge, as indicated by the broken lines at the right hand side of Fig. 4, and by tightening said nut the parts are held together.

The elongated leaf 15 is shown as rectangular in form at its free end while the pivoted end is rounded to conform generally to the form of the leaf part to which it is pivoted. In the leaf 15 around the hole 15ª is a series of bolt holes 16 spaced equally from each other and from the center hole 15ª a distance equal to the radius of arcuate slots 12 from the center hole of the circular parts. Said slots can therefore expose two of said holes at one time and at least three of said holes always coincide with the arcuate slots in whatever position a leaf part may be turned to on its bolt 13. Suitable bolts and nuts can be applied to any or all of the holes 16 that coincide with the arcuate slots to secure the leaves of the joint at one side of the hinge firmly together and any additional or suitable and obvious means, as for example a roughening of the contiguous faces of the leaves can be resorted to to augment the tightness of the connection when the nuts are tightened up. It will be observed also that the described spacing of the holes 16 and arcuate slots 12 admit of laterally offsetting the leaf 15 as respects a line connecting the center holes of the circular leaf parts of the hinge as illustrated by broken lines at the left hand side of Fig. 4, and in Fig. 2.

The rectangular end of the leaf part 15 is provided with a series of holes preferably in staggered arrangement for bolting the joint to the respective parts to be connected.

From the construction shown it will be observed that the hinge is in effect universally adjustable and can be applied to the rafters and to the ridges and hips in all or nearly all the peculiar relations which they may bear to each other.

To provide a sturdy thrust bearing at the base of the rafter where it connects with the plate and for use in connection with my invention the construction shown in Fig. 6 can be adopted. In this case the device consists of a base member 20 perforated to be bolted to the plate 21 and having at one end an upstanding portion 22 to which the rafter 23 is bolted by bolt 24 and an arcuate slot 25 concentric with the bolt 24 through which slot 25 and a hole in the rafter another bolt can be secured. In this construction the proper pitch and alinement of the rafters can be obtained by oscillation of the hinge leaves on the bolt 24 and then both bolts secured to hold the rafter firmly in position.

The use of the universal connections permits of the proper inclination and alinement of the rafters and will eliminate the need of any specially shop-fabricated connections. The only field work necessary after the joint has been assembled being the drilling of holes in the light rafters and this can be quickly done with a screw punch. The vertical pivot of the universal connection transfers the end shear from the end of one rafter to some point on the hip or ridge rafter and will make a good stiff joint when tightened up.

The forms of the parts can be changed without departing from the gist of the invention as claimed.

What I claim is:

1. Means for connecting a rafter to a roof frame member including leaves for attachment to the rafter and frame member respectively, universally adjustable means connecting said leaves, and means for securing said leaves in adjustment with regard to the frame and the rafter respectively.

2. Means for connecting a rafter to a roof frame member including leaves for attachment to the rafter and frame member respectively and universally adjustable means connecting said leaves for securing them in adjustment with regard to the rafter, one portion of said universally adjustable means connecting said leaves adjustable laterally on the leaf with which it is connected.

3. Means for connecting a rafter to a roof frame member including leaves for attachment to the rafter and frame member respectively and universally adjustable means connecting said leaves for securing them in adjustment with regard to the rafter and matchable holes in one of said leaves and one portion of said universally adjustable means for permitting lateral adjustment of said parts in relation to each other and means in said holes for securing said parts in such laterally adjusted relation.

FREDERICK L. PURDY.